United States Patent
Tian et al.

(10) Patent No.: US 12,119,169 B1
(45) Date of Patent: Oct. 15, 2024

(54) HOT PRESS MOLDING METHOD FOR INDUCTOR

(71) Applicant: Shenzhen Topsun Technology Co., Ltd., Guangdong (CN)

(72) Inventors: Lin Tian, Guangdong (CN); Weifeng Wu, Guangdong (CN)

(73) Assignee: Shenzhen Topsun Technology Co., Ltd., Guangdong (CN)

( * ) Notice: Subject to any disclaimer, the term of this patent is extended or adjusted under 35 U.S.C. 154(b) by 0 days.

(21) Appl. No.: 18/748,188

(22) Filed: Jun. 20, 2024

(30) Foreign Application Priority Data

Dec. 14, 2023 (CN) .......................... 202311719375.9

(51) Int. Cl.
| | | |
|---|---|---|
| *H01F 41/02* | (2006.01) | |
| *B22F 3/14* | (2006.01) | |
| *B22F 3/24* | (2006.01) | |
| *B22F 7/08* | (2006.01) | |
| *H01F 41/04* | (2006.01) | |
| *C25D 5/12* | (2006.01) | |

(52) U.S. Cl.
CPC ............ *H01F 41/0246* (2013.01); *B22F 3/14* (2013.01); *B22F 3/24* (2013.01); *B22F 7/08* (2013.01); *H01F 41/04* (2013.01); *B22F 2003/242* (2013.01); *B22F 2003/248* (2013.01); *B22F 2998/10* (2013.01); *C25D 5/12* (2013.01)

(58) Field of Classification Search
CPC .......... B22F 7/062; B22F 7/08; H01F 27/255; H01F 41/0246; H01F 41/04
See application file for complete search history.

(56) References Cited

U.S. PATENT DOCUMENTS

| | | | |
|---|---|---|---|
| 2020/0373057 A1* | 11/2020 | Chen ........................ | C25D 7/00 |
| 2024/0127998 A1* | 4/2024 | Nagasaki ............ | H01F 41/0246 |

FOREIGN PATENT DOCUMENTS

| | | | | |
|---|---|---|---|---|
| CN | 108369850 A | | 8/2018 | |
| CN | 111755233 A | * | 10/2020 | |
| CN | 112397295 A | * | 2/2021 | ............. H01F 41/00 |
| CN | 113380513 A | * | 9/2021 | |
| CN | 215643922 U | | 1/2022 | |
| CN | 114141523 A | * | 3/2022 | |
| CN | 115206669 A | * | 10/2022 | |
| KR | 2010101479 A | * | 9/2010 | |

OTHER PUBLICATIONS

First Office Action cited in corresponding Chinese patent Application No. 202311719375.9, dated Jan. 27, 2024, 14 pages.

* cited by examiner

*Primary Examiner* — Samir Shah
*Assistant Examiner* — Sean P. O'Keefe
(74) *Attorney, Agent, or Firm* — Cooper Legal Group, LLC (57) ABSTRACT

Disclosed is a hot press molding method for an inductor, including: S1: manufacturing an inductance coil, a first magnetic powder block and a second magnetic powder block; the inductance coil being in a U shape, and one side of the first magnetic powder block being provided with an embedding groove; S2: placing the inductance coil into the embedding groove; pins of the inductance coil being located outside the embedding groove; S3: placing the second magnetic powder block into the inductance coil; the second magnetic powder block being simultaneously attached to inner walls of the inductance coil and the embedding groove; S4: hot-pressing the inductance coil, the first magnetic powder block and the second magnetic powder block by a hot pressing mold.

8 Claims, 8 Drawing Sheets

HOT PRESS MOLDING METHOD FOR INDUCTOR

CROSS-REFERENCE TO RELATED APPLICATION

This application claims the priority and benefit of Chinese patent application No. 202311719375.9, filed on Dec. 14, 2023. The entirety of Chinese patent application No. 202311719375.9 is hereby incorporated by reference herein and made a part of this specification.

FIELD OF THE INVENTION

The present application relates to the field of inductor manufacturing, and in particular, to a hot press molding method for an inductor.

BACKGROUND OF THE INVENTION

With the development of semiconductor industry, an inductor, as an important semiconductor device, develops towards miniaturization and integration.

In the prior art, the inductor is generally molded by hot pressing. For example, a combined inductor generally includes a first magnetic powder block, a second magnetic powder block, and a magnetic powder cover plate, wherein the first magnetic powder block, the second magnetic powder block, and the magnetic powder cover plate are made of magnetic powder; a first groove is formed in a lateral side of the first magnetic powder block close to the second magnetic powder block, two first openings are formed in a bottom surface of the first magnetic powder block by the first groove, a first coil is placed in the first groove, and two pins of the first coil extend out of the two first openings respectively; a second groove is formed in a lateral side of the second magnetic powder block close to the magnetic powder cover plate, two second openings are formed in a bottom surface of the second magnetic powder block by the second groove, a second coil is placed in the second groove, and two pins of the second coil extend out of the two second openings respectively; the first magnetic powder block, the second magnetic powder block and the magnetic powder cover plate are combined together by hot pressing.

For the related art, during hot press molding, the coil is prone to deform under the action of a hot pressing mold, such that the pins of the coil cannot be located on the same plane, and further, when the inductor is mounted, plural pins cannot effectively contact a circuit board at the same time, thus influencing normal use of the inductor.

SUMMARY

The present application provides a hot press molding method for an inductor, so as to keep pins of the inductor on the same plane after hot pressing and guarantee normal use of the inductor.

The following technical solution is adopted for the hot press molding method for an inductor according to the present application.

A hot press molding method for an inductor includes:
S1: manufacturing an inductance coil, a first magnetic powder block and a second magnetic powder block;
the inductance coil being provided in a U shape, and one side of the first magnetic powder block being provided with an embedding groove;
S2: placing the inductance coil into the embedding groove;
pins of the inductance coil being located outside the embedding groove;
S3: placing the second magnetic powder block into the inductance coil;
the second magnetic powder block being simultaneously attached to inner walls of the inductance coil and the embedding groove;
S4: hot-pressing the inductance coil, the first magnetic powder block and the second magnetic powder block by a hot pressing mold; the side of the first magnetic powder block provided with the embedding groove being set as one hot pressing surface, and a side of the first magnetic powder block away from the embedding groove being set as the other hot pressing surface;
S5: performing rolling spraying on the inductance coil, the first magnetic powder block and the second magnetic powder block;
S6: stripping paint from pins of the inductance coil; and
S7: electroplating the pins of the inductance coil.

By adopting the above technical solution, the second magnetic powder block and the inductance coil are both provided in the embedding groove, the side of the first magnetic powder block provided with the embedding groove is set as one hot pressing surface, and the side of the first magnetic powder block away from the embedding groove is set as the other hot pressing surface, such that a hot pressing pressure of the hot pressing mold directly acts on the inductance coil by contact, and then, the pins of the inductance coil are always kept in contact with the hot pressing mold in a hot press molding process, thereby keeping the pins of the inductance coil on the same plane after hot pressing, ensuring that the pins of the inductance coil are effectively and simultaneously in contact with a circuit board when the inductor is mounted, and guaranteeing the normal use of the inductor.

Optionally, in the step S1, a number of the embedding grooves is two, and depth directions of the two embedding grooves are parallel;
in the step S2, the inductance coils are required to be placed in the two embedding grooves respectively;
in the step S4, the second magnetic powder blocks are required to be placed into the two embedding grooves respectively.

By adopting the above technical solution, the inductance coils in the two embedding grooves are isolated from each other by the first magnetic powder block, thereby facilitating a guarantee of a heat dissipation effect and an insulating effect of the inductance coil.

Optionally, the first magnetic powder block and the second magnetic powder block are both molded by cold-pressing soft magnetic alloy powder, a cold press molding pressure is 2-6 t/cm$^2$, the soft magnetic alloy powder is doped with organic resin, and a mass percent of the organic resin is 3+/−1%.

By adopting the above technical solution, the organic resin bonds soft magnetic alloy powder particles with each other, thereby improving strength of the first magnetic powder block and the second magnetic powder block. In addition, the organic resin covers a peripheral surface of the inductance coil, such that the inductance coil is not prone to leak electricity, thus facilitating a guarantee of long-term work of the inductance coil.

Optionally, in the step S5, before the inductance coil, the first magnetic powder block, and the second magnetic powder block are subjected to rolling spraying, the inductance coil, the first magnetic powder block, and the second magnetic powder block are baked.

By adopting the above technical solution, the organic resin is cured by baking, such that bonding strength between the organic resin and the soft magnetic alloy powder particles is ensured, the first magnetic powder block and the second magnetic powder block are not prone to be damaged due to long-time rolling during rolling spraying, and therefore, the inductance coil is not prone to shift due to cracks or gaps of the first magnetic powder block generated by rolling.

Optionally, a baking temperature is 150-180° C., and a baking time is 3-6 h.

By adopting the above technical solution, when the temperature exceeds 180° C., magnetization intensity of the soft magnetic alloy powder is prone to decrease obviously, thus influencing inductance intensity of the inductor. When the temperature is lower than 150° C., the organic resin cannot be sufficiently cured, which is not favorable for ensuring the bonding strength of the inductance coil, the soft magnetic alloy powder particles and the organic resin.

Optionally, in the step S4, a hot press molding pressure of the inductance coil, the first magnetic powder block and the second magnetic powder block is 4-10 t/cm², a hot press molding temperature of the inductance coil, the first magnetic powder block and the second magnetic powder block is 150-250° C., and a hot press molding time of the inductance coil, the first magnetic powder block and the second magnetic powder block is 60-180 s.

By adopting the above technical solution, firstly, when the hot press molding pressure is less than 4 t/cm², the inductance coil, and the first magnetic powder block and the second magnetic powder block cannot be effectively bonded, such that the inductance coil is prone to deflect in subsequent working procedures. In addition, the pins of the inductance coil are usually bent, such that gaps are usually generated between the pins of the inductance coil and the first magnetic powder block, and if the hot press molding pressure is less than 4 t/cm², the gaps are prone to develop into closed bubbles in the hot press molding process, thereby greatly influencing product quality of the inductor. Since the inductance coil is located on the hot pressing surface and an error is inevitably generated when the inductance coil is placed in the embedding groove, when the hot press molding pressure is greater than 10 t/cm², the placement error of the inductance coil is prone to be further amplified under a hot pressing action of the hot pressing mold, such that bending deflection of the inductance coil occurs, and then, the inductance coil is damaged to affect a yield of the inductor.

Secondly, when the hot press molding temperature is lower than 150° C., the inductance coil, the first magnetic powder block and the second magnetic powder block cannot be effectively bonded, such that the inductance coil is prone to deflect in the subsequent working procedures; local temperatures of the pins of the inductance coil in direct contact with the hot pressing mold are often high, such that thermal deformation of the first magnetic powder block and the second magnetic powder block is smaller than that of the pins of the inductance coil usually containing copper. When the hot press molding temperature is higher than 250° C., a difference between the thermal deformation of the first magnetic powder block and the second magnetic powder block and the deformation of the pin of the inductance coil is large, such that the inductance coil, the first magnetic powder block and the second magnetic powder block generate large temperature stress after subsequent hot pressing cooling, straightness of the pin of the inductance coil is influenced, and the bonding strength among the first magnetic powder block, the second magnetic powder block and the inductance coil is also influenced.

Finally, when the hot press molding time is less than 60 s, the organic resin is not easy to cure, which is not favorable for guaranteeing the effective bonding among the inductance coil, the first magnetic powder block and the second magnetic powder block. When the hot press molding time is more than 180 s, the organic resin is prone to be over-cured to cause embrittlement, such that the inductor is damaged in subsequent processing, transportation and use processes. In addition, by limiting the hot press molding time to be less than 180 s, the difference between the thermal deformation of the first magnetic powder block and the second magnetic powder block and the deformation of the pin of the inductance coil is not prone to be difficultly controlled due to a too long time, such that the inductance coil, the first magnetic powder block and the second magnetic powder block generate small temperature stress after subsequent hot pressing cooling, which is favorable for guaranteeing the straightness of the pin of the inductance coil and guaranteeing the bonding strength among the first magnetic powder block, the second magnetic powder block and the inductance coil.

Optionally, in the step S4, before the inductance coil, the first magnetic powder block, and the second magnetic powder block are placed into the hot pressing mold, the hot pressing mold is preheated, and a temperature of the preheated hot pressing mold is 300±50° C.

By adopting the above technical solution, before the inductance coil, the first magnetic powder block and the second magnetic powder block are placed into the hot pressing mold, the temperature of the hot pressing mold is preheated to 300+/−50° C., such that all parts of the first magnetic powder block and the second magnetic powder block are within a stable temperature range, thus reducing defects of cracks, or the like, caused by temperature stress due to an overlarge temperature difference of all parts of the pin of the inductance coil usually containing copper, the first magnetic powder block and the second magnetic powder block caused by a temperature rise.

Optionally, in the step S5, before the pins of the inductance coil are subjected to rolling spraying, corners of the first magnetic powder block are chamfered, and a chamfering radius is 0.1-0.3 mm.

By adopting the above technical solution, after the corner of the first magnetic powder block is chamfered, sharpness of the corner of the first magnetic powder block is reduced, such that a rolling spraying coating is more prone to be evenly applied to a whole outer surface of the inductance coil, the first magnetic powder block and the second magnetic powder block, thereby guaranteeing rolling spraying quality of the inductor.

Optionally, in the step S7, after the pin of the inductance coil is electroplated, an electroplated layer is formed, the electroplated layer includes a copper plated layer, a nickel plated layer, and a tin plated layer, a thickness of the copper plated layer is 4-10 μm, a thickness of the nickel plated layer is 3-10 μm, and a thickness of the tin plated layer is 5-12 μm.

Optionally, in the step S1, the second magnetic powder block includes a first block and a second block, the first block is provided with a first inclined surface, and the second block is provided with a second inclined surface;

in the step S4, when the inductance coil, the first magnetic powder block, and the second magnetic powder block are hot-pressed, the first inclined surface abuts against the second inclined surface, and the first block and the second block move away from each other.

By adopting the above technical solution, during hot pressing, the first inclined surface abuts against the second inclined surface, and the first block and the second block move away from each other, such that the first block or the second block abuts against an interior of the inductance coil, and then, the inductance coil always abuts against the inner wall of the embedding groove during hot press molding, thus reducing the deflection of the inductance coil in the hot press molding process caused by the placement error of the inductance coil.

In summary, the present application has at least one of the following beneficial effects.

1. The second magnetic powder block and the inductance coil are both provided in the embedding groove, the side of the first magnetic powder block provided with the embedding groove is set as one hot pressing surface, and the side of the first magnetic powder block away from the embedding groove is set as the other hot pressing surface, such that the hot pressing pressure of the hot pressing mold directly acts on the inductance coil by contact, and then, the pins of the inductance coil are always kept in contact with the hot pressing mold in the hot press molding process, thereby keeping the pins of the inductance coil on the same plane after hot pressing, ensuring that the pins of the inductance coil are effectively and simultaneously in contact with the circuit board when the inductor is mounted, and guaranteeing the normal use of the inductor.

2. After the corner of the first magnetic powder block is chamfered, the sharpness of the corner of the first magnetic powder block is reduced, such that the rolling spraying coating is more prone to be evenly applied to an outer surface of the first magnetic powder block, thereby guaranteeing rolling spraying quality of the first magnetic powder block.

3. During hot pressing, the first inclined surface abuts against the second inclined surface, and the first block and the second block move away from each other, such that the first block or the second block abuts against the interior of the inductance coil, and then, the inductance coil always abuts against the inner wall of the embedding groove during hot press molding, thus reducing the deflection of the inductance coil in the hot press molding process caused by the placement error of the inductance coil.

List of reference signs: 1. inductance coil; 11. first coil; 12. second coil; 101. coil chamber; 102. first chamber; 103. second chamber; 2. first magnetic powder block; 201. embedding groove; 3. second magnetic powder block; 301. block chamber; 31. first block; 32. second block; 33. third block; 34. fourth block; 4. electroplated layer; 41. copper plated layer; 42. nickel plated layer; 43. tin plated layer.

DETAILED DESCRIPTION

The present application is described in further detail below with reference to FIGS. 1 to 8.

A first embodiment of the present application discloses a hot press molding method for an inductor. The hot press molding method for an inductor according to the first embodiment of the present application specifically includes the following steps:

S1: manufacturing an inductance coil 1, a first magnetic powder block 2 and a second magnetic powder block 3.

Figure 1:
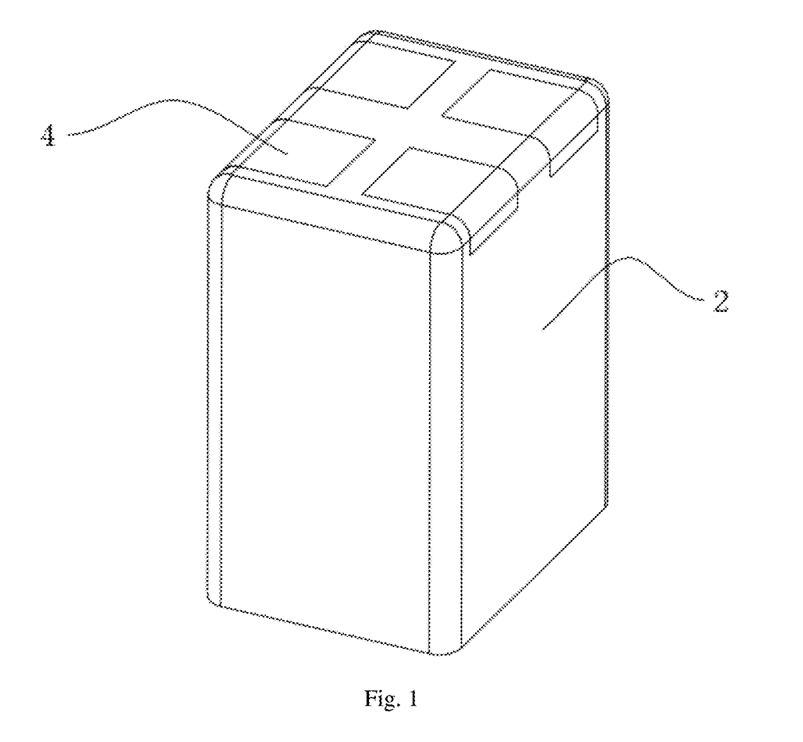
FIG. 1 is an overall schematic diagram of an overall structure in a first embodiment of the present application.
Figure 2:
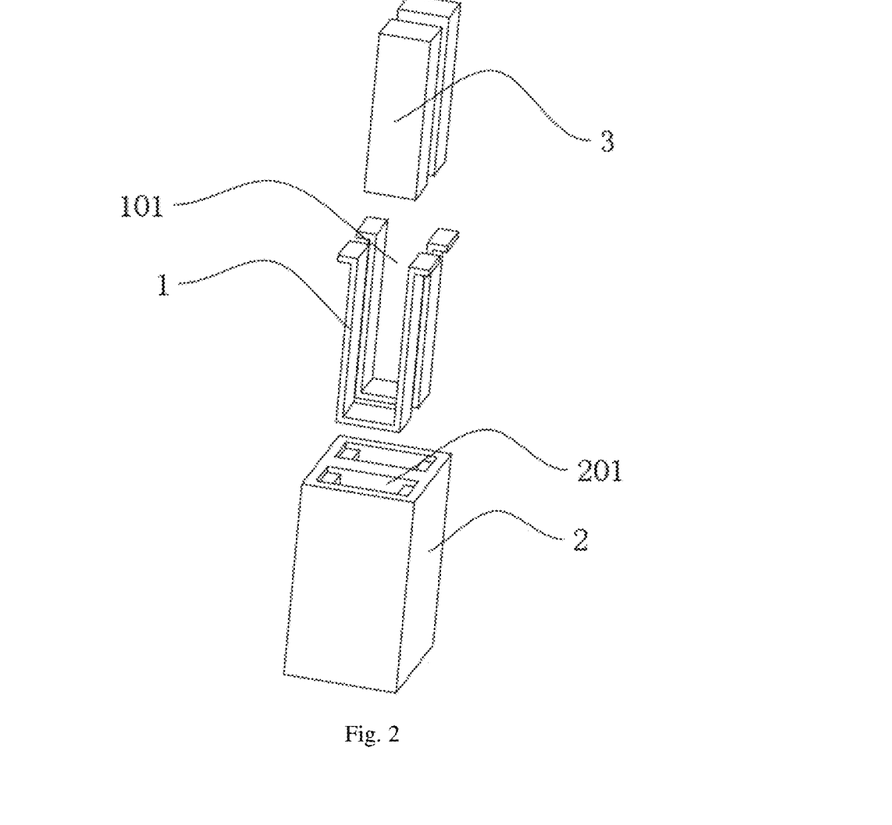
FIG. 2 is a schematic diagram of a combination relationship of an inductor in the first embodiment of the present application.

Referring to FIGS. 1 and 2, in the embodiment of the present application, the inductance coil 1 is made of copper. The inductance coil 1 is in a U shape; that is, the inductance coil 1 is bent to form a coil chamber 101, and two ends of the inductance coil 1 are bent by 90 degrees in directions away from each other to form two pins. The inductance coil 1 is molded using a stamping process to ensure production efficiency.

Referring to FIG. 2, the first magnetic powder block 2 has a rectangular parallelepiped shape, one side of the first magnetic powder block 2 is provided with two embedding grooves 201, and depth directions of the two embedding grooves 201 are parallel;

the first magnetic powder block 2 is molded by cold-pressing soft magnetic alloy powder, the soft magnetic alloy powder includes iron powder, nickel powder, molybdenum powder and amorphous powder, organic resin is doped in the soft magnetic alloy powder, and a mass percent of the organic resin is 3+/−1%; that is, mass of the organic resin accounts for 3+/−1% of total mass of the soft magnetic alloy powder and the organic resin, such that soft magnetic alloy powder particles are mutually bonded by the organic resin, and then, strength of the first magnetic powder block 2 is ensured, and the inductance coil 1 is not prone to leak electricity through the organic resin.

A cold press molding pressure of the first magnetic powder block 2 is 2-6 t/cm², and a cold press molding time is 2-3 s, so as to ensure effective bonding between the soft magnetic alloy powder particles and organic resin particles, thereby ensuring cold press molding quality of the first magnetic powder block 2. In addition, in the embodiment of the present application, a plurality of first magnetic powder blocks 2 are molded through cold pressing simultaneously by a single mold to ensure a molding efficiency of the first magnetic powder blocks 2.

Referring to FIG. 2, the second magnetic powder block is in a rectangular parallelepiped shape, and a height of the second magnetic powder block is the same as a depth of the embedding groove 201. The second magnetic powder block is molded by cold-pressing soft magnetic alloy powder, the soft magnetic alloy powder includes iron powder, nickel powder, molybdenum powder and amorphous powder, organic resin is doped in the soft magnetic alloy powder, and a mass percent of the organic resin is 3+/−1%; that is, mass of the organic resin accounts for 3+/−1% of total mass of the soft magnetic alloy powder and the organic resin, such that soft magnetic alloy powder particles are mutually bonded by the organic resin, and then, strength of the second magnetic powder block is ensured, and the inductance coil 1 is not prone to leak electricity through the organic resin. In addition, components and a proportion thereof of the soft magnetic alloy powder for molding the second magnetic powder block are the same as those of the soft magnetic alloy powder for molding the first magnetic powder block 2, so as to guarantee uniformity of inductance strength of the inductor.

A cold press molding pressure of the second magnetic powder block is 2-6 t/cm², and a cold press molding time is 2-3 s, so as to ensure effective bonding between the soft magnetic alloy powder particles and organic resin particles, thereby ensuring cold press molding quality of the second magnetic powder block. In addition, in the embodiment of the present application, a plurality of second magnetic powder blocks are molded through cold pressing simultaneously by a single mold to ensure a molding efficiency of the second magnetic powder blocks.

S2: placing the inductance coil 1 into the embedding groove 201.

S21: fixing the first magnetic powder block 2, and allowing the side of the first magnetic powder block 2 provided with the embedding groove 201 to be provided in a vertical upward direction;

S22: simultaneously placing the two inductance coils 1 in the embedding grooves 201 respectively by a manipulator, and allowing the pins of the two inductance coils 1 to be located outside the embedding grooves 201.

S3: placing the second magnetic powder block into the inductance coil 1; the second magnetic powder block being simultaneously attached to inner walls of the inductance coil 1 and the embedding groove 201.

S31: fixing the first magnetic powder block 2 with the placed inductance coil 1, and allowing the pins of the inductance coil 1 to be provided in the vertical upward direction;

S32: simultaneously placing the two second magnetic powder blocks into the coil chambers 101 respectively by the manipulator, and allowing the second magnetic powder blocks to be simultaneously attached to inner walls of the coil chambers 101 and the inner wall of the embedding groove 201, so as to ensure that the coil is not prone to shake in subsequent transportation and processing.

S4: preheating a hot pressing mold, and then hot-pressing the inductance coil 1, the first magnetic powder block 2 and the second magnetic powder block 3 by the hot pressing mold.

A hot pressing temperature of the whole of the inductance coil 1, the first magnetic powder block 2 and the second magnetic powder block 3 is 150-250° C.; a hot pressing pressure of the whole of the inductance coil 1, the first magnetic powder block 2 and the second magnetic powder block 3 is 4-10 t/cm²; a hot press molding time of the whole of the inductance coil 1, the first magnetic powder block 2 and the second magnetic powder block 3 is 60-180 s, such that the soft magnetic alloy powder and the organic resin are effectively cured to guarantee curing strength of the first magnetic powder block 2 and the second magnetic powder block 3.

A temperature of the preheated hot pressing mold is 300+/−50° C., such that the required hot pressing temperature (i.e., 150-250° C.) can be quickly reached after the inductance coil 1, the first magnetic powder block 2 and the second magnetic powder block 3 are placed into the hot pressing mold, which reduces defects of cracks, or the like, caused by uneven temperature deformation of the first magnetic powder block 2 and the second magnetic powder block 3 due to the fact that a large temperature difference is generated by different thicknesses of parts of the first magnetic powder block 2 and the second magnetic powder block 3, thereby facilitating a guarantee of manufacturing quality of the inductor.

When the whole of the inductance coil 1, the first magnetic powder block 2 and the second magnetic powder block 3 is hot-pressed, the side of the first magnetic powder block 2 provided with the embedding groove 201 is set as one hot pressing surface, i.e., one surface to which the pressure is applied by the hot pressing mold, and a side of the first magnetic powder block 2 away from the embedding groove 201 is set as the other hot pressing surface, i.e., the other surface to which the pressure is applied by the hot pressing mold, such that the hot pressing mold with high precision always simultaneously and directly abuts against each pin of the inductance coil 1 and the side of the first magnetic powder block 2 provided with the embedding groove 201 in the hot pressing process, the inductance coil 1 is not prone to deflect or deform due to uneven thermal deformation of the first magnetic powder block 2, and the pins of the inductance coil 1 are always kept on the same plane after hot pressing, thereby ensuring that when the inductor is mounted, the pins of the inductance coil 1 are effectively and simultaneously in contact with a circuit board, and guaranteeing normal use of the inductor.

S5: baking the whole of the inductance coil 1, the first magnetic powder block 2 and the second magnetic powder block 3, then chamfering corners of the first magnetic powder block 2, and finally performing rolling spraying on the whole of the inductance coil 1, the first magnetic powder block 2 and the second magnetic powder block 3.

A baking temperature of the whole of the inductance coil 1, the first magnetic powder block 2 and the second magnetic powder block 3 is 150-180° C., and a baking time of the whole of the inductance coil 1, the first magnetic powder block 2 and the second magnetic powder block 3 is 3-6 h. By limiting the baking temperature and the baking time to 150-180° C. and 3-6 h respectively, the organic resin is cured on the premise of ensuring that magnetization intensity of the soft magnetic alloy powder is not prone to be greatly reduced, the organic resin bonds the soft magnetic alloy powder particles, the organic resin closely covers a peripheral surface of the inductance coil 1, and electricity leakage of the inductance coil 1 is reduced.

A chamfering radius of the first magnetic powder block 2 is 0.1-0.3 mm, such that sharpness of the corners of the first magnetic powder block 2 is reduced through chamfering, and then, a rolling spraying coating is effectively and uniformly applied on the whole of the inductance coil 1, the first magnetic powder block 2 and the second magnetic powder block 3, and therefore, the iron powder in the soft magnetic alloy powder is not prone to oxidize and rust.

S6: stripping paint from each pin of the inductance coil 1.

By stripping the paint from the pins of the inductance coil 1, the rolling spraying coating is removed, and the pins of the inductance coil 1 and the soft magnetic alloy powder particles are exposed, so as to electroplate the pins of the inductance coil 1.

S7: electroplating each pin of the inductance coil 1.

Figure 3:
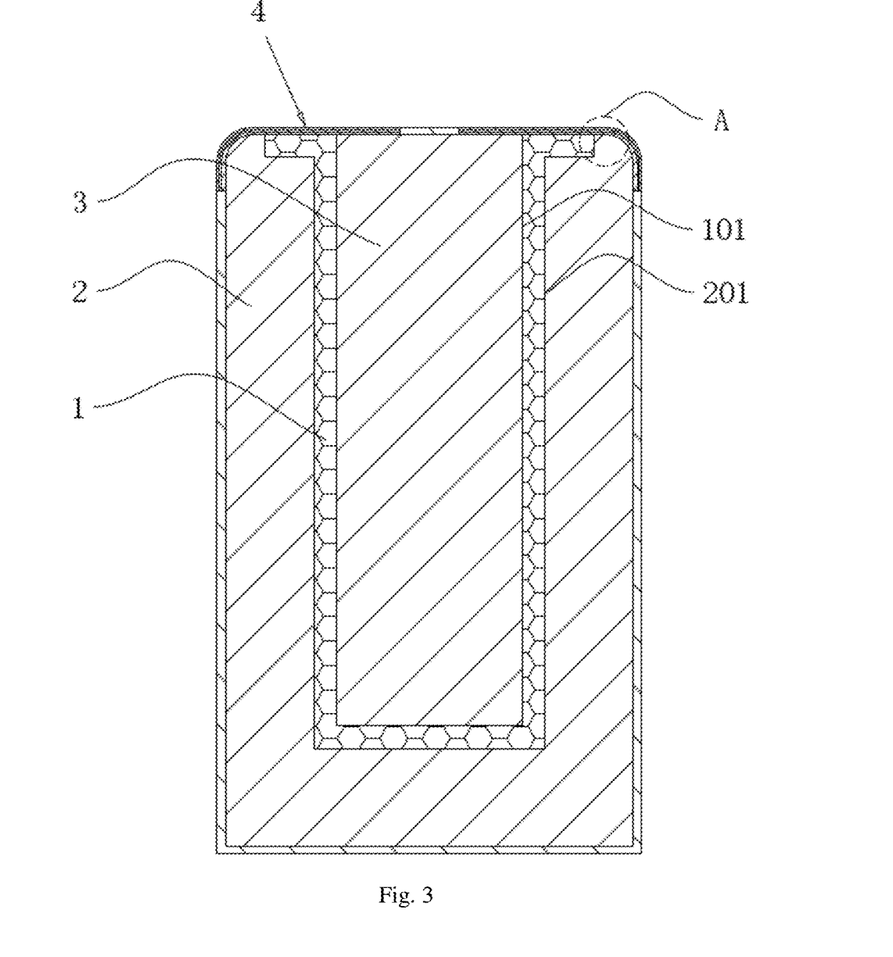
FIG. 3 is an overall schematic sectional diagram of the overall structure in the first embodiment of the present application.
Figure 4:
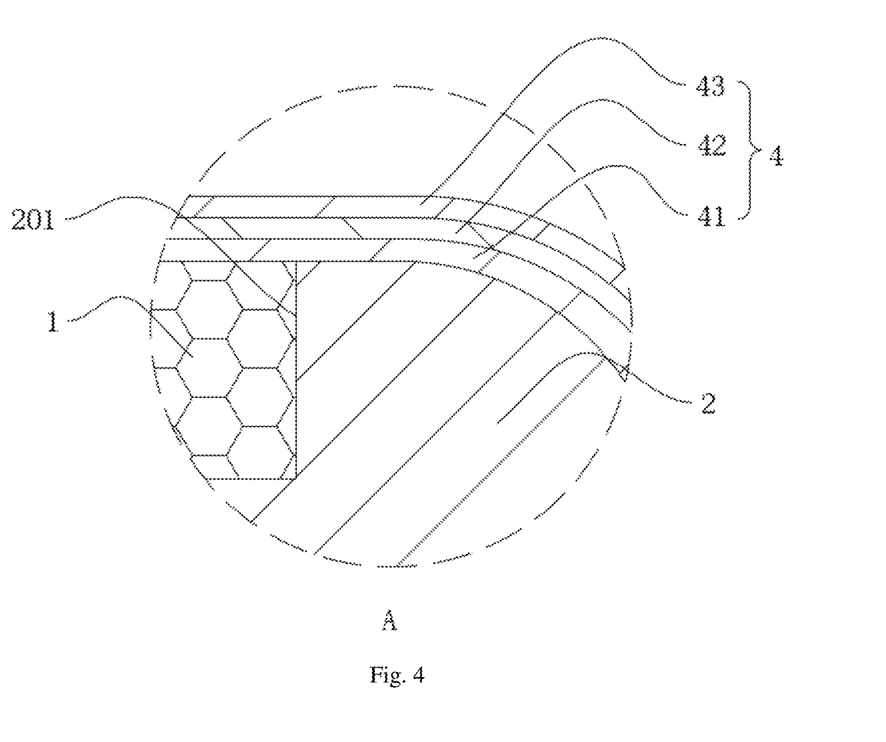
FIG. 4 is a schematic enlarged diagram of part A of FIG. 3.

Referring to FIGS. 3 and 4, after the pins of the inductance coil 1 are electroplated, an electroplated layer 4 is formed. The electroplated layer 4 covers the pin of the inductance coil 1, and the electroplated layer 4 is bent and extends along the corner of the first magnetic powder block 2, such that the inductor can be conveniently mounted on the circuit board.

Referring to FIG. 4, the electroplated layer 4 includes a copper plated layer 41, a nickel plated layer 42, and a tin plated layer 43, a thickness of the copper plated layer 41 is 4-10 µm, a thickness of the nickel plated layer 42 is 3-10 µm, and a thickness of the tin plated layer 43 is 5-12 µm.

The hot press molding method for an inductor according to the first embodiment of the present application has the following implementation principle: the second magnetic powder block 3 and the inductance coil 1 are arranged in the embedding groove 201, and the hot pressing mold directly abuts against the inductance coil 1, such that the pressure of the hot pressing mold directly acts on the inductance coil 1, the inductance coil 1 is not prone to deform in the hot pressing process, and therefore, the pins of the inductance coil 1 are kept on the same plane after hot pressing, thereby ensuring that the pins of the inductance coil 1 are effectively and simultaneously in contact with the circuit board when the inductor is mounted, and guaranteeing the normal use of the inductor.

Second Embodiment

The second embodiment of the present application is mainly different from the first embodiment in that:
1. the second magnetic powder block 3 is provided differently;
2. the specific steps of the step S3 are different.

Figure 5:
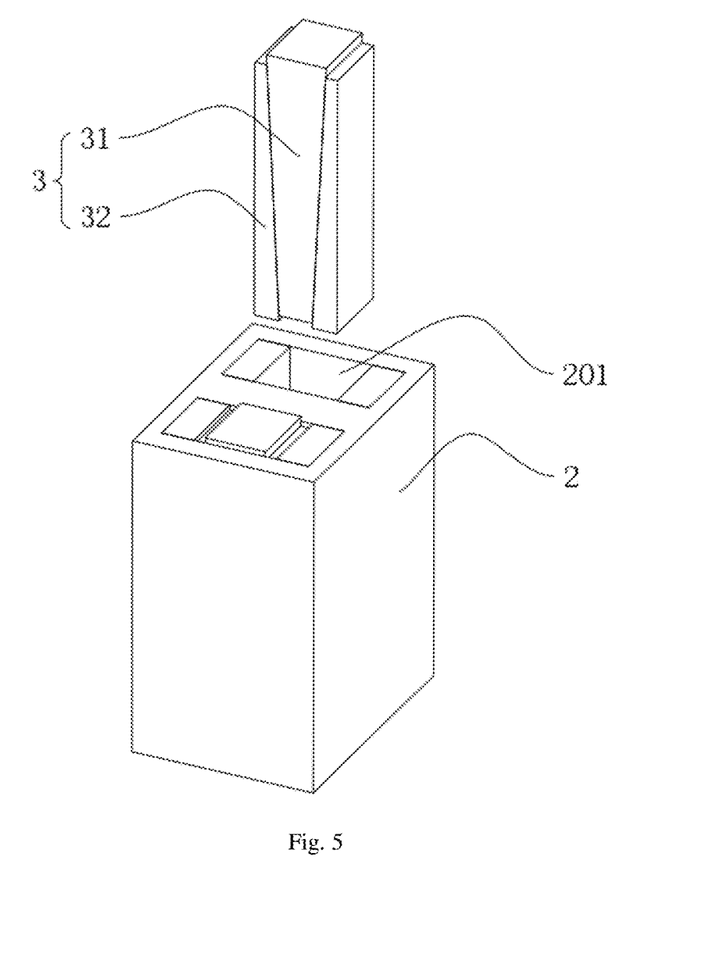
FIG. 5 is a schematic diagram of a combination relationship of a second magnetic powder block and a first magnetic powder block in a second embodiment of the present application.
Figure 6:
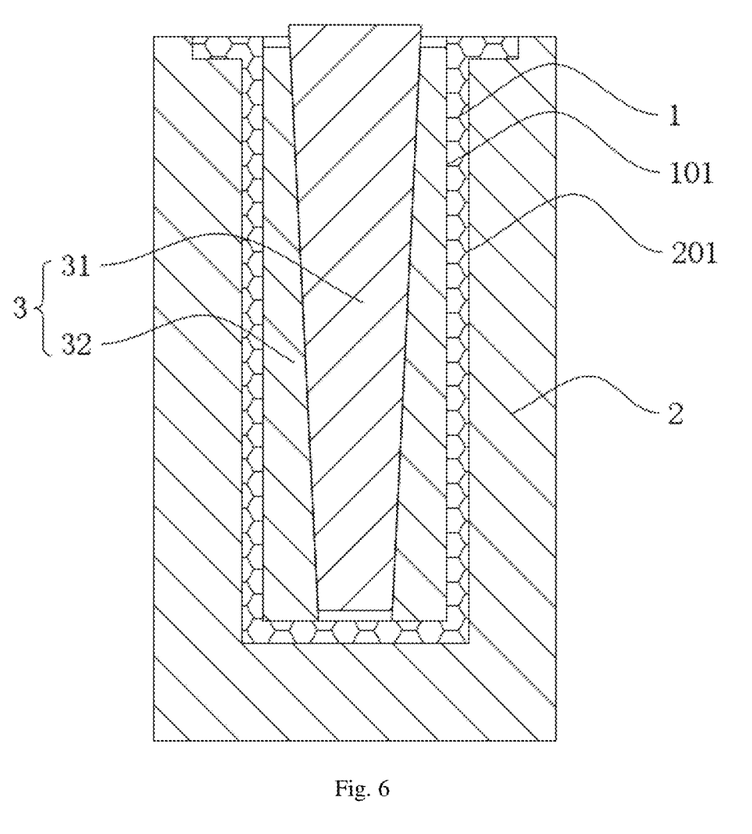
FIG. 6 is a schematic sectional diagram of the second magnetic powder block and the first magnetic powder block in the second embodiment of the present application.

Referring to FIGS. 5 and 6, the second magnetic powder block 3 includes a first block 31 and a second block 32. A cross section of the first block 31 is in an isosceles trapezoid shape, and an end of the first block 31 with a small width is provided close to a bottom of the embedding groove 201. The first block 31 is provided with two first inclined surfaces, the two first inclined surfaces are located on two sides of the first block 31 respectively, and the two first inclined surfaces are provided away from each other. The first inclined surface extends from a top to the bottom of the embedding groove 201 and is inclined towards an axis of the embedding groove 201. In the embodiment of the present application, two second blocks 32 are provided. Cross sections of the two second blocks 32 are both in a right trapezoid shape, and the two second blocks 32 are provided close to the first inclined surfaces respectively. The second block 32 is provided with a second inclined surface, and the second inclined surface extends from the top to the bottom of the embedding groove 201 and is inclined towards the axis of the embedding groove 201.

Referring to FIG. 6, when the second magnetic powder block is provided in the coil chamber 101, that is, the first block 31 and the second block 32 are both provided in the coil chamber 101, the first inclined surface abuts against the second inclined surface, and an end of the first block 31 with a large width protrudes outside the embedding groove 201. When the whole of the inductance coil 1, the first magnetic powder block 2 and the second magnetic powder block 3 is hot-pressed, the hot pressing mold first abuts against the end of the first block 31 with the large width, and the first block 31 and the second block 32 move away from each other, such that the two second blocks abut against the coil chamber 101, and therefore, the inductance coil 1 always abuts against the inner wall of the embedding groove 201 during hot press molding, thus reducing the deflection of the inductance coil 1 in the hot press molding process caused by the placement error of the inductance coil 1.

The hot press molding method for an inductor according to the second embodiment of the present application specifically includes the following steps:
S1: manufacturing the inductance coil 1, the first magnetic powder block 2, the first block 31, and the second block 32.
S2: placing the inductance coil 1 into the embedding groove 201.
S3: placing the second magnetic powder block into the inductance coil 1.
S31: placing the two second blocks 32 into a second chamber 103;
S32: placing the first block 31 into a block chamber 301.
S4: preheating the hot pressing mold, and then hot-pressing the whole of the inductance coil 1, the first magnetic powder block 2, the first block 31, and the second block 32 by the hot pressing mold.
S5: baking the whole of the inductance coil 1, the first magnetic powder block 2, the first block 31 and the second block 32, then chamfering the corners of the first magnetic powder block 2, and finally performing rolling spraying on the whole of the inductance coil 1, the first magnetic powder block 2, the first block 31 and the second block 32.
S6: stripping paint from each pin of the inductance coil 1.
S7: electroplating each pin of the inductance coil 1.

The second embodiment of the present application has the following implementation principle: when the whole of the inductance coil 1, the first magnetic powder block 2 and the second magnetic powder block 3 is hot-pressed, the hot pressing mold first abuts against the first block 31 and then abuts against the pins of the inductance coil 1, such that the pins of the inductance coil 1 are kept on the same plane after hot pressing, thereby ensuring that the pins of the inductance coil 1 are effectively and simultaneously in contact with the circuit board when the inductor is mounted, and guaranteeing the normal use of the inductor.

Third Embodiment

The third embodiment of the present application is mainly different from the first embodiment in that:
1. the inductance coil 1 is provided differently;
2. the second magnetic powder block 3 is provided differently;
3. the specific steps of the step S2 and the step S3 are different.

Figure 7:
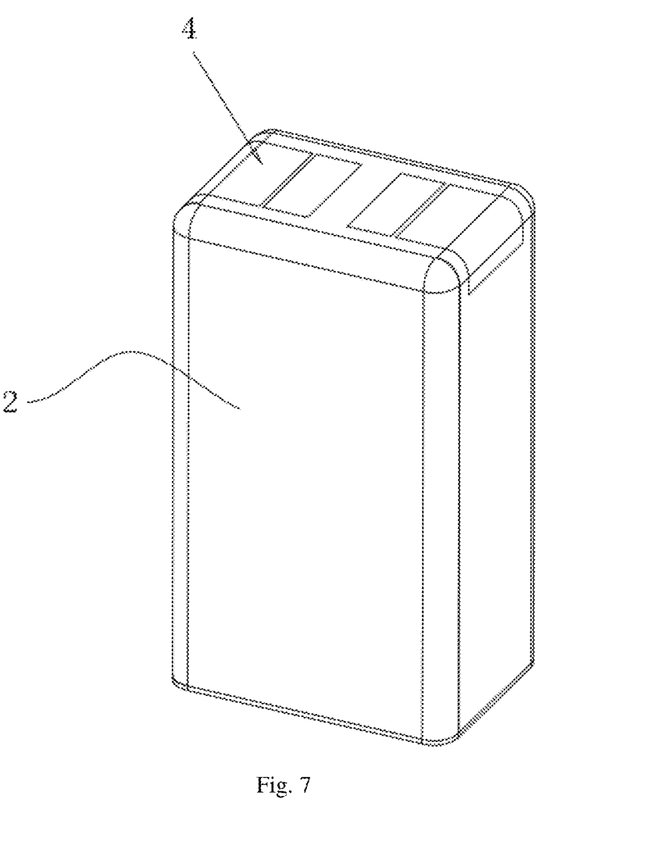
FIG. 7 is an overall schematic diagram of an overall structure in a third embodiment of the present application.
Figure 8:
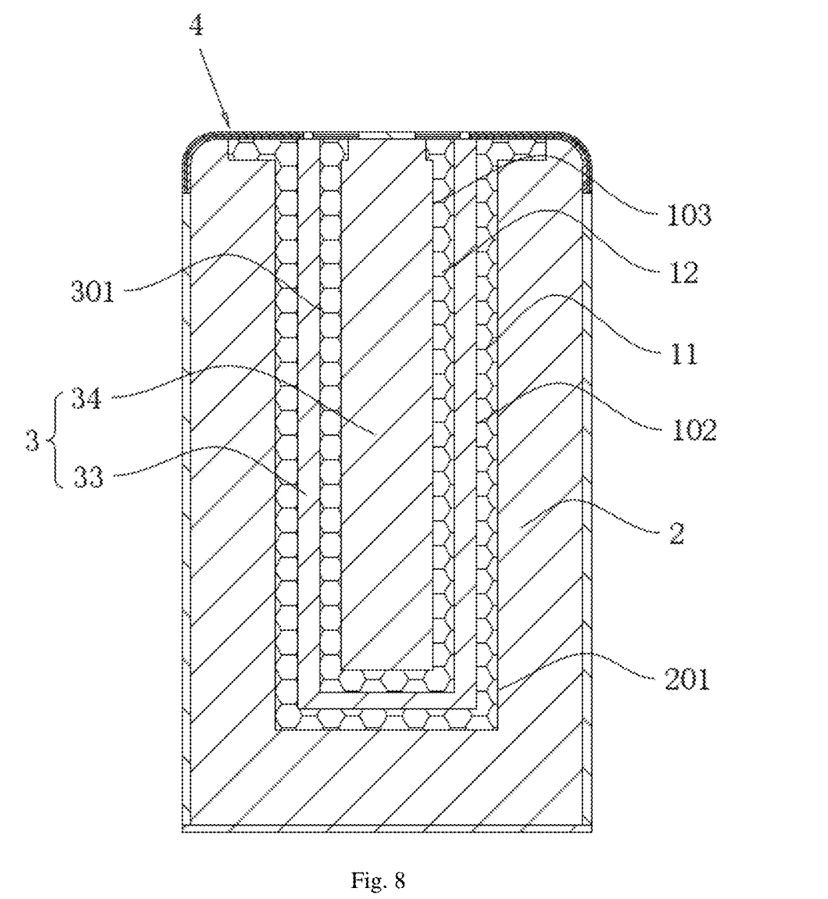
FIG. 8 is an overall schematic sectional diagram of the overall structure in the third embodiment of the present application.

Referring to FIGS. 7 and 8, in the embodiment of the present application, two inductance coils 1 are provided, and one of the inductance coils 1 is set as a first coil 11, and the other inductance coil 1 is set as the second coil 12. The first coil 11 is in a U shape; that is, the first coil 11 is bent to form a first chamber 102, and two ends of the first coil 11 are bent by 90 degrees in directions away from each other to form two first pins. The second coil 12 is also in a U shape; that is, the second coil 12 is bent to form a second chamber 103, and two ends of the second coil 12 are bent by 90 degrees in directions close to each other to form two second pins.

Referring to FIG. 8, the second magnetic powder block 3 includes a third block 33 and a fourth block 34, and the third block 33 is in a U shape; that is, the third block 33 is bent to form a block chamber 301, and the fourth block 34 is in a quasi-rectangular parallelepiped shape;

Referring to FIG. 8, after the inductor is molded, the first coil 11 abuts against the inner wall of the embedding groove 201, the third block 33 abuts against the first chamber 102, the second coil 12 abuts against the block chamber 301, and the fourth block 34 abuts against the second chamber 103;

that is, the first coil 11 and the second coil 12 are both located in the embedding groove 201 to reduce a volume of the inductor.

The hot press molding method for an inductor according to the third embodiment of the present application specifically includes the following steps:

S1: manufacturing the first coil 11, the second coil 12, the first magnetic powder block 2, the third block 33, and the fourth block 34.

S2: placing the inductance coil 1 into the embedding groove 201.

S21: placing the first coil 11 into the embedding groove 201;

S22: placing the third block 33 into the first chamber 102.

S3: placing the second magnetic powder block into the inductance coil 1.

S31: placing the second block 32 into the second chamber 103;

S32: placing the second block 32 and the second coil 12 together into the block chamber 301.

S4: preheating the hot pressing mold, and then hot-pressing the whole of the first coil 11, the second coil 12, the first magnetic powder block 2, the third block 33, and the fourth block 34 by the hot pressing mold. During hot pressing, the hot pressing mold simultaneously abuts against the first coil 11, the second coil 12, the first magnetic powder block 2, the third block 33 and the fourth block 34, such that the first coil 11 and the second coil 12 which are close to each other are not prone to deflect due to deformation of the third block 33 with a small thickness during hot pressing, and therefore, the pins of the inductor are kept on the same plane after hot pressing, so as to guarantee the normal use of the inductor.

S5: baking the whole of the first coil 11, the second coil 12, the first magnetic powder block 2, the third block 33 and the fourth block 34, chamfering the corners of the first magnetic powder block 2, and finally performing rolling spraying on the whole of the first coil 11, the second coil 12, the first magnetic powder block 2, the third block 33 and the fourth block 34.

S6: stripping paint from each pin of the inductance coil 1.

S7: electroplating each pin of the inductance coil 1.

An implementation principle of the third embodiment of the present application is the same as that of the first embodiment, and is repeated herein.

The above embodiments are preferred embodiments of the present application, and the protection scope of the present application is not limited thereby, and therefore, equivalent changes made according to the structure, shape and principle of the present application shall be covered by the protection scope of the present application.

What is claimed is:

1. A hot press molding method for an inductor, comprising:
   S1: manufacturing two inductance coils, a first magnetic powder block and two second magnetic powder blocks;
   wherein, the two inductance coils are both in a U shape, and a first side of the first magnetic powder block is provided with two embedding grooves; depth directions of the two embedding grooves are parallel to each other;
   in the step S1, each of the two second magnetic powder blocks comprises a first block and a second block, the first block is provided with a first inclined surface, and the second block is provided with a second inclined surface;
   S2: placing the two inductance coils into the two embedding grooves respectively;
   wherein, pins of the two inductance coils are arranged outside the two embedding grooves;
   S3: placing the two second magnetic powder blocks into the two inductance coils respectively;
   wherein, the two second magnetic powder blocks are attached to inner walls of the two inductance coils and the two embedding grooves respectively;
   S4: hot-pressing the two inductance coils, the first magnetic powder block and the two second magnetic powder blocks by a hot pressing mold;
   wherein, the first side of the first magnetic powder block is set as a first hot pressing surface, and a second side of the first magnetic powder block away from the two embedding grooves is set as a second hot pressing surface;
   in the step S4, the two second magnetic powder blocks are placed in the two embedding grooves respectively; when the two inductance coils, the first magnetic powder block and the two second magnetic powder blocks are hot-pressed, the first inclined surface abuts against the second inclined surface, and the first block and the second block move away from each other;
   S5: performing rolling spraying on the two inductance coils, the first magnetic powder block and the two second magnetic powder blocks;
   S6: stripping paint from the pins of the two inductance coils; and
   S7: electroplating the pins of the two inductance coils.

2. The hot press molding method for an inductor according to claim 1, wherein, the first magnetic powder block and the two second magnetic powder blocks are both molded by cold-pressing soft magnetic alloy powder with a cold press molding pressure of 2-6 t/cm$^2$, the soft magnetic alloy powder is doped with organic resin, and a mass percent of the organic resin is 3+/−1%.

3. The hot press molding method for an inductor according to claim 1, wherein, in the step S5, before performing the rolling spraying on the two inductance coils, the first magnetic powder block, and the two second magnetic powder blocks, baking the two inductance coils, the first magnetic powder block, and the two second magnetic powder blocks.

4. The hot press molding method for an inductor according to claim 3, wherein, a temperature of the baking is 150-180° C., and time for the baking is 3-6 h.

5. The hot press molding method for an inductor according to claim 1, wherein, in the step S4, a pressure of the hot-pressing the two inductance coils, the first magnetic powder block and the two second magnetic powder blocks is 4-10 t/cm$^2$, a temperature of the hot-pressing the two inductance coils, the first magnetic powder block and the two second magnetic powder blocks is 150-250° C., and time for the hot-pressing the two inductance coils, the first magnetic powder block and the two second magnetic powder blocks is 60-180 s.

6. The hot press molding method for an inductor according to claim 5, wherein, in the step S4, before placing the two inductance coils, the first magnetic powder block, and the two second magnetic powder blocks into the hot pressing mold, preheating the hot pressing mold with a temperature of 300±50° C.

7. The hot press molding method for an inductor according to claim 1, wherein, in the step S5, before performing the rolling spraying the pins of the two inductance coils, chamfering corners of the first magnetic powder block with a chamfering radius of 0.1-0.3 mm.

8. The hot press molding method for an inductor according to claim 1, wherein, in the step S7, after the pins of the two inductance coils are electroplated, an electroplated layer is formed, the electroplated layer comprises a copper plated layer, a nickel plated layer, and a tin plated layer, a thickness of the copper plated layer is 4-10 μm, a thickness of the nickel plated layer is 3-10 μm, and a thickness of the tin plated layer is 5-12 μm.

* * * * *